(12) United States Patent
Takahashi et al.

(10) Patent No.: US 9,143,073 B2
(45) Date of Patent: Sep. 22, 2015

(54) POSITION CONTROL DEVICE FOR ELECTRIC MOTOR

(75) Inventors: Toshimichi Takahashi, Ota (JP);
Kuniaki Hirao, Numazu (JP);
Shizunori Hamada, Numazu (JP);
Yasuhiro Kanazashi, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 306 days.

(21) Appl. No.: 13/885,865

(22) PCT Filed: Nov. 18, 2011

(86) PCT No.: PCT/JP2011/076660
§ 371 (c)(1),
(2), (4) Date: May 16, 2013

(87) PCT Pub. No.: WO2012/067229
PCT Pub. Date: May 24, 2012

(65) Prior Publication Data
US 2013/0229137 A1    Sep. 5, 2013

(30) Foreign Application Priority Data

Nov. 19, 2010    (JP) ................................. 2010-258420

(51) Int. Cl.
*H02P 6/08*    (2006.01)
*H02P 21/00*    (2006.01)
*H02P 23/00*    (2006.01)
*H02P 23/12*    (2006.01)
*H02P 29/00*    (2006.01)

(52) U.S. Cl.
CPC .......... *H02P 21/0003* (2013.01); *H02P 23/005* (2013.01); *H02P 23/12* (2013.01); *H02P 29/0005* (2013.01)

(58) Field of Classification Search
CPC ..................................... H02P 5/00; H02P 6/08
USPC ......... 318/466–468, 609, 610, 615, 616, 619, 318/621, 623, 626
See application file for complete search history.

(56) References Cited

U.S. PATENT DOCUMENTS 5,091,684 A * 2/1992 Iwashita ....................... 318/616
5,115,418 A * 5/1992 Shimada ....................... 318/616
(Continued)

FOREIGN PATENT DOCUMENTS

JP    9-179602 A    7/1997
JP    10-78801 A    3/1998
(Continued)

*Primary Examiner* — Bentsu Ro
(74) *Attorney, Agent, or Firm* — Foley & Lardner LLP

(57) ABSTRACT

Position control device for electric motor inputs deviation signal between angle command and angle detection value to position control section and calculates angular velocity command, inputs deviation signal between this angular velocity command and angular velocity detection value to speed control section and calculates torque current command, and controls, according to this torque current command, the electric motor current control section. The Position control device has disturbance observer section which inputs the torque current command and the angular velocity detection value and estimates signal corresponding to disturbance torque; rate-of-change limitation section which has limiter inputting disturbance observer output value by this disturbance observer section and performing rate-of-change limitation of upper and lower limit values of the angle command; and target value filter section which is configured by control gain equivalent to the speed control section and through which the angular velocity command from the position control section passes.

7 Claims, 10 Drawing Sheets

BLOCK DIAGRAM OF POSITION CONTROL DEVICE OF
THE PRESENT INVENTION

(56) References Cited

U.S. PATENT DOCUMENTS

| | | | |
|---|---|---|---|
| 5,418,440 A | * | 5/1995 | Sakaguchi et al. ............ 318/560 |
| 5,598,077 A | * | 1/1997 | Matsubara et al. ...... 318/568.22 |
| 5,929,700 A | | 7/1999 | Fuller et al. |

FOREIGN PATENT DOCUMENTS

| | | |
|---|---|---|
| JP | 2002-325473 A | 11/2002 |
| JP | 2005-204472 A | 7/2005 |

* cited by examiner

BLOCK DIAGRAM OF POSITION CONTROL DEVICE OF
THE PRESENT INVENTION

BLOCK DIAGRAM OF RATE-OF-CHANGE LIMITATION SECTION

BLOCK DIAGRAM OF DISTURBANCE OBSERVER SECTION

COMMAND VALUE STEP RESPONSE CHARACTERISTICS BY POSITION CONTROL

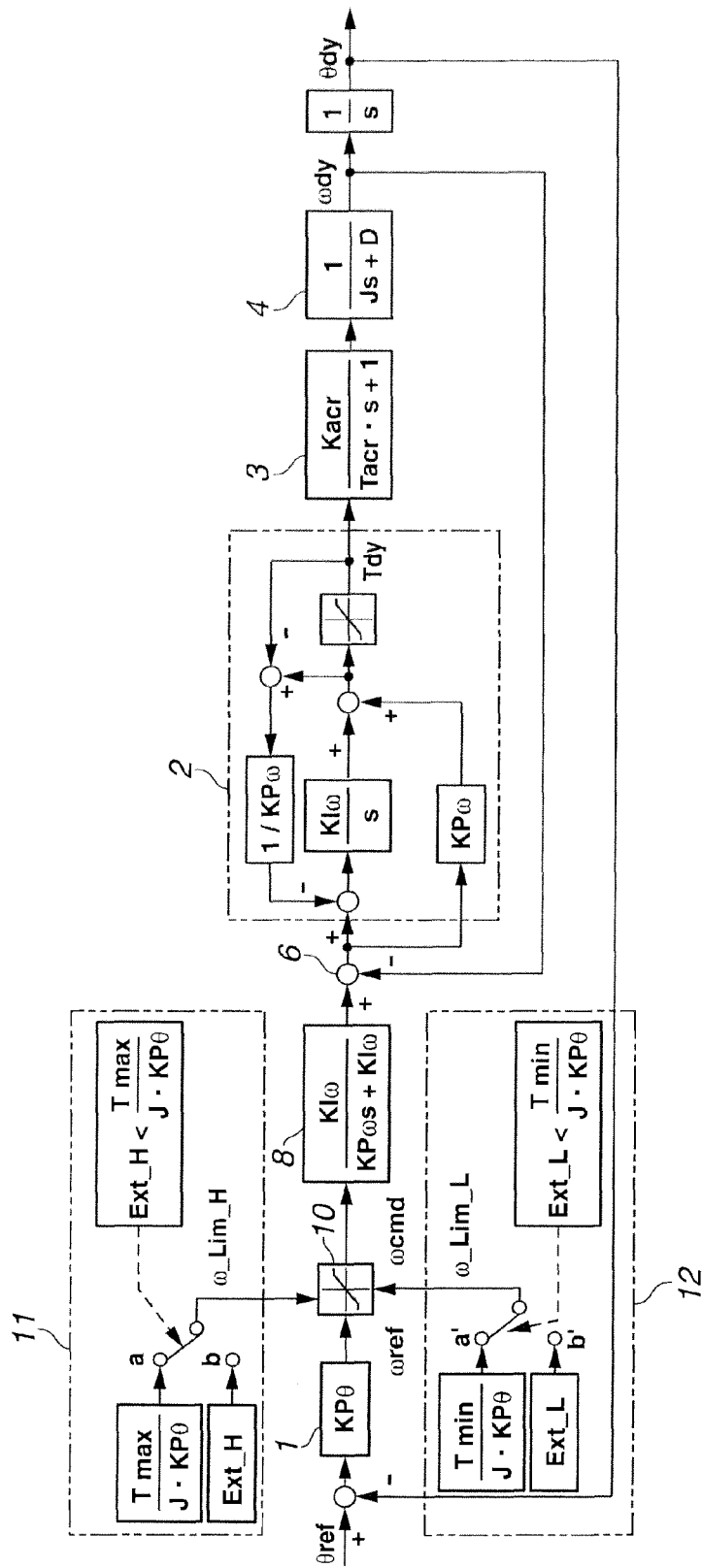

COMMAND VALUE STEP RESPONSE CHARACTERISTICS BY POSITION CONTROL

BLOCK DIAGRAM OF POSITION CONTROL DEVICE OF
THE PRESENT INVENTION

BLOCK DIAGRAM OF RATE-OF-CHANGE LIMITATION SECTION

FIG.9A COMMAND VALUE STEP RESPONSE CHARACTERISTICS BY POSITION CONTROL
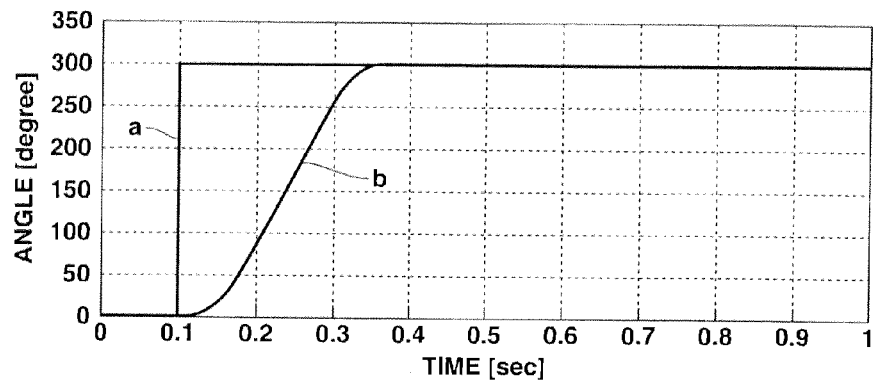
FIG.9B
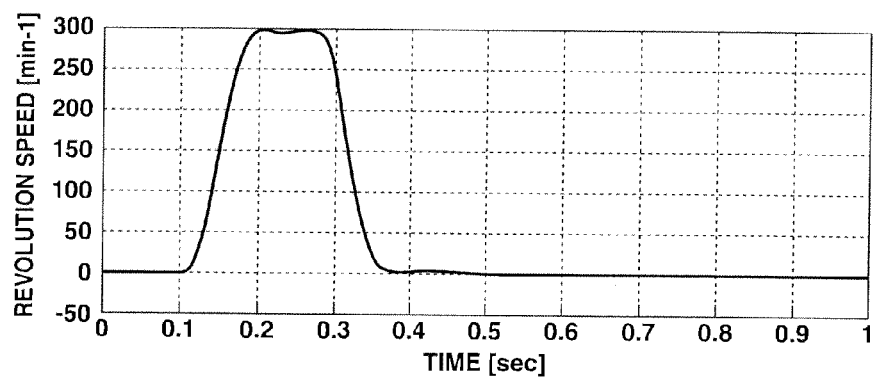
FIG.9C
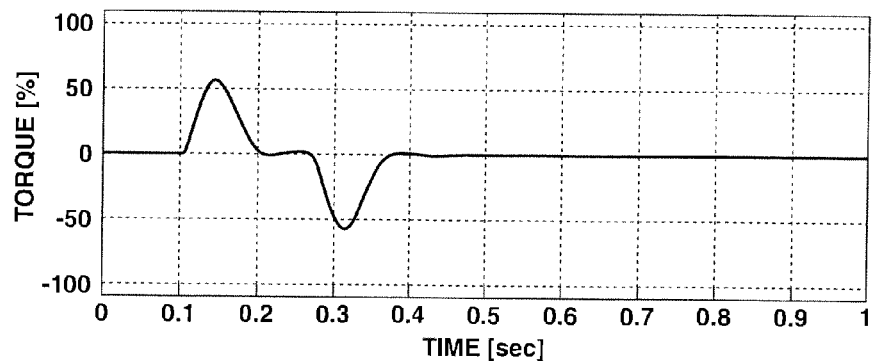

BLOCK DIAGRAM OF RELATED ART POSITION CONTROL DEVICE

COMMAND VALUE STEP RESPONSE CHARACTERISTICS BY
RELATED ART POSITION CONTROL

US 9,143,073 B2

POSITION CONTROL DEVICE FOR ELECTRIC MOTOR

TECHNICAL FIELD

The present invention relates to a position control device for an electric motor, and more particularly to a control system that has a current control section and a speed control section in a minor loop and a position control section in a major loop then controls the position of the electric motor.

BACKGROUND ART

FIG. 10 shows a schematic block diagram of a position control device. A reference sign 1 is a position control section, a reference sign 2 is a speed control section, a reference sign 3 is a current control section and a reference sign 4 is a mechanical property section of a rotor that is an object to be controlled (an electric motor).

The position control section 1 inputs a deviation signal between an angle command θref and an angle detection θdy which are setting inputs of the position control device, and the position control section 1 calculates an angular velocity command ωref. A difference signal between this calculated angular velocity command ωref and an angular velocity detection ωdy is determined in a subtraction section 6 and is inputted to the speed control section 2. The speed control section 2 then calculates a torque current command Tdy. The mechanical property section 4 of the rotor is controlled by this torque current command Tdy through the current control section 3. And the angular velocity detection ωdy, at this time, of the mechanical, property section 4 of the rotor is returned to the subtraction section 6 as feedback, then a difference operation (a difference calculation) between the angular velocity command ωref and the angular velocity detection ωdy is performed.

In addition, the angle detection θdy of the mechanical property section 4 is returned to a subtraction section 5 as feedback, then a difference operation (a difference calculation) between the angle command θref and the angle detection θdy is performed.

A technique that executes such position control described above is known by Patent Document 1 etc. This Patent Document 1 discloses that even in a case where parameters of resonance/antiresonance frequencyies of a mechanical system are unknown, in order to suppress vibration of the mechanical system, a vibration suppression compensator is provided, and the vibration suppression compensator inputs a deviation between a speed command determined by calculation and a speed detection signal and generates a speed command compensation signal, then the sum of this compensation signal and a speed command basic signal is set as a speed signal.

Patent Document 1: Japanese Patent Application Publication No. JP2002-325473

SUMMARY OF THE INVENTION

As shown in FIG. 10, a configuration for the position control of the electric motor has the speed control system in the minor loop and the position control system in the major loop. Then, in the speed control of the minor loop, the speed is controlled by a PI control (a proportional-plus-integral control), whereas in the position control of the major loop, the position control is carried out by a P control (a proportional control).

FIGS. 11A to 11C show command values and their response characteristics in a related art position control device shown in FIG. 10. FIG. 11A is an angle detection value characteristic of an angle command value, FIG. 11B is a revolution speed characteristic, and FIG. 11C is a torque characteristic.

Since the electric motor that is an object to be controlled has a range of torque which the electric motor can output, as shown in FIG. 10, a torque limiter is provided in the speed control section 2, and torque limit is set. Because of this, as shown in FIG. 11C, when such angle command θref (see a line "a" in FIG. 11A) that the torque current command Tdy is limited to ±100% torque current limits is inputted, the angle detection θdy indicated by a line "b" overshoots, then by this overshoot, the revolution speed and the torque respectively shown in FIGS. 11B and 11C greatly vary, and there occur vibration and overshooting phenomenon called a so-called windup.

In recent years, for instance, for the sake of production of vibration for a dynamometer system etc., a position control device having a more stable and higher response frequency characteristic has been required. However, as described above, since the electric motor has the outputable torque range, in the case where the torque limit is imposed in the speed control section 2 in the related art position control device, there is a need to take a measure against the windup, and a windup measure for the position control is also required. Because of this, it becomes difficult to make an adjustment to achieve the high response in a feedback control. In addition, if the position control is performed at a low response as the windup measure, it is difficult for the position control response to be high.

It is therefore an object of the present invention to provide a position control device that is capable of performing a position control with a high response to the command value.

According to one aspect of the present invention, a position control device for an electric motor, which inputs a deviation signal between an angle command and an angle detection value to a position control section and calculates an angular velocity command, inputs a deviation signal between this angular velocity command and an angular velocity detection value to a speed control section and calculates a torque current command, and controls, on the basis of this torque current command, the electric motor that is an object to be controlled through a current control section, comprises: a disturbance observer section which inputs the torque current command and the angular velocity detection value and estimates a signal corresponding to a disturbance torque; a rate-of-change limitation section which has a limiter inputting a disturbance observer output value by this disturbance observer section and performing rate-of-change limitation of upper and lower limit values of the angle command; and a target value filter section which is configured by a control gain equivalent to the speed control section and through which the angular velocity command from the position control section passes.

According to another aspect of the present invention, a rate-of-change limiter upper limit value of the rate-of-change limitation section is a value obtained by subtracting an output absolute value of the disturbance observer section from a rated maximum driving torque of the electric motor, multiplying this subtraction result by a sampling interval and dividing this multiplication value by motor inertia and a proportional gain of the position control section, and a rate-of-change limiter lower limit value of the rate-of-change limitation section is a value obtained by adding a rated maximum regenerative torque of the electric motor and the output absolute value of the disturbance observer section together, multiplying this addition result by the sampling interval and dividing this multiplication value by the motor inertia and the proportional gain of the position control section.

According to a further aspect of the invention, a low-pass filter is provided at an output side of the limiter of the rate-of-change limitation section.

According to a further aspect of the invention, the disturbance observer section estimates, as a corresponding disturbance torque, a difference signal between the angular velocity detection value and the torque current command.

According to a further aspect of the invention, a position control device for an electric motor, which inputs a deviation signal between an angle command and an angle detection value to a position control section and calculates an angular velocity command, inputs a deviation signal between this angular velocity command and an angular velocity detection value to a speed control section and calculates a tongue current command, and controls, on the basis of this torque current command, the electric motor that is an object to be controlled through a current control section, comprises: a speed limiter which is provided at an output side of the position control section for speed limitation; and a target value filter section which is configured by a control gain equivalent to the speed control section and through which the angular velocity command passing through the speed limiter passes.

According to a further aspect of the invention, an angular velocity limiter upper limit value of the speed limiter is a value determined by a fact that a rated maximum driving tongue of the electric motor is divided by motor inertia and a proportional gain of the position control section, and an angular velocity limiter lower limit value of the speed limiter is a value determined by a fact that a rated maximum regenerative torque is divided by the motor inertia and the proportional gain of the position control section.

According to a further aspect of the invention, the speed limiter is provided with an angular velocity limiter upper limit judgment section and an angular velocity limiter Lower limit judgment section for allowing variation of the angular velocity limiter upper limit value and the angular velocity limiter lower limit value respectively.

BRIEF DESCRIPTION OF THE DRAWINGS

FIG. 5 is a block diagram of a position control device showing a second embodiment of the present invention.

FIGS. 9A to 9C are command value step response characteristics according to the third embodiment.

EMBODIMENTS FOR CARRYING OUT THE INVENTION

The present invention is the one in which, a limiter is provided in a position control device, and by properly setting an upper limit value and a lower limit value of the limiter, an overshoot amount of a position detection value against a rapidly varied angular velocity command is reduced. The present invention will be explained below on the basis of each embodiment.

Figure 1:
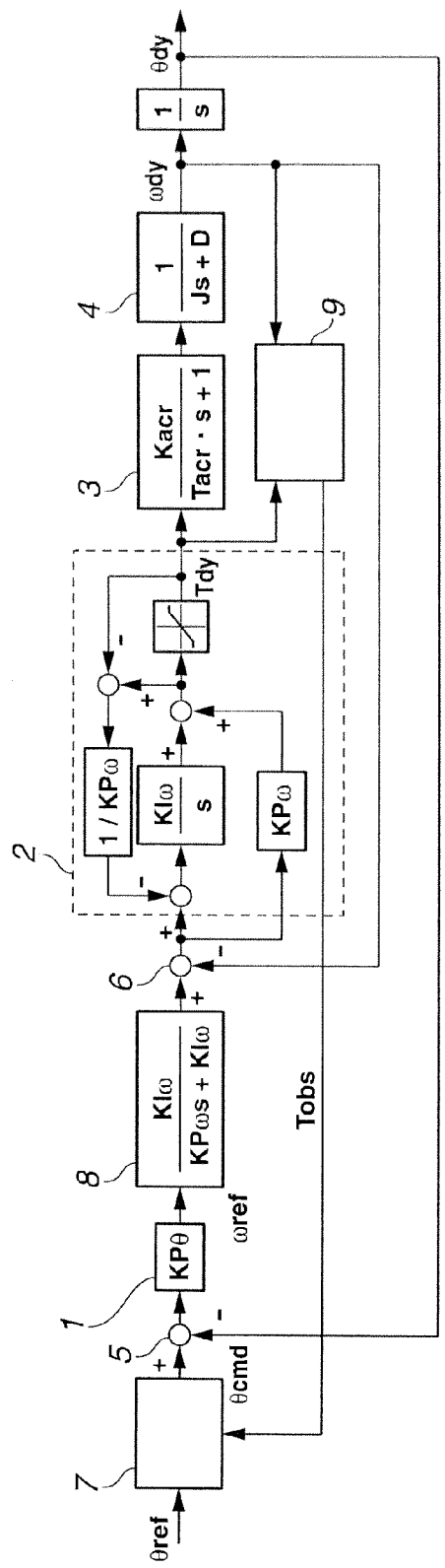
FIG. 1 is a block diagram of a position control device showing a first embodiment of the present invention.
Figure 10:
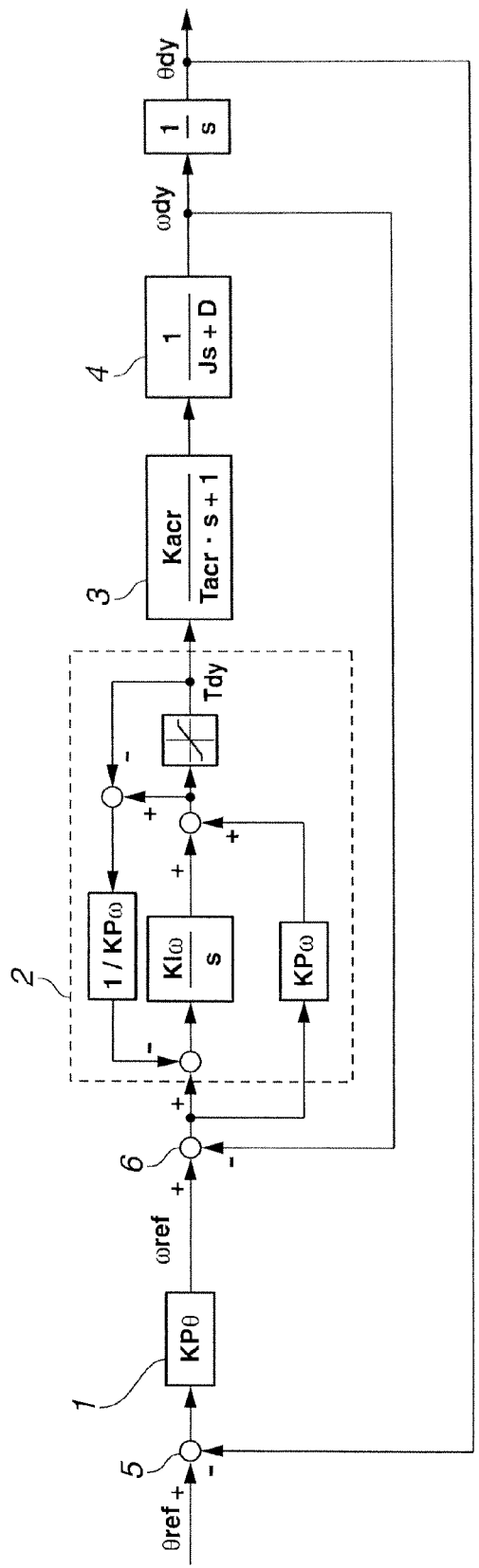
FIG. 10 is a block diagram of a related art position control device.
Figure 11A:
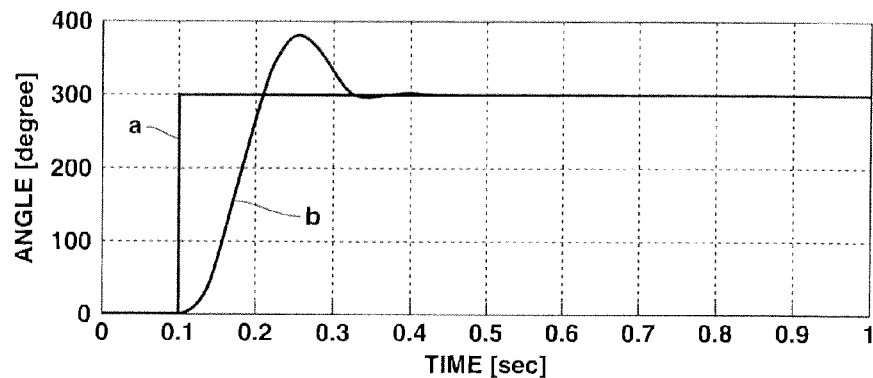
FIGS. 11A to 11C are command value step response characteristics according to the related art position control device.
Figure 11B:
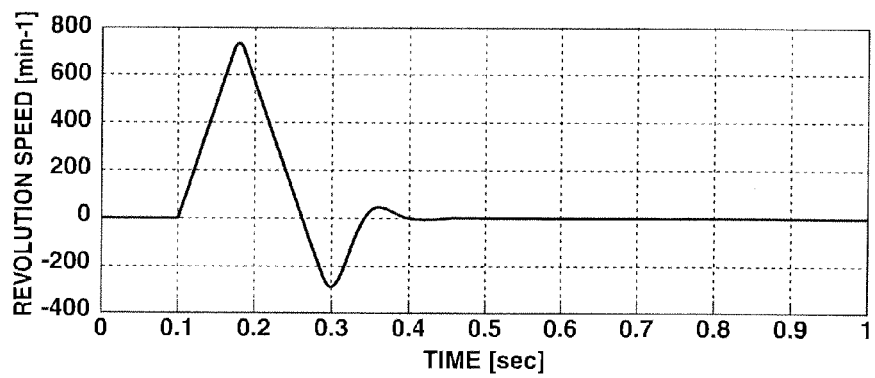
Figure 11C:
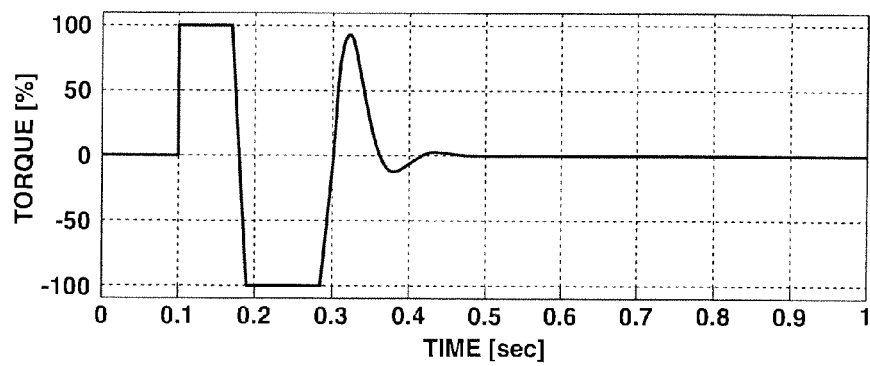

FIG. 1 a block diagram showing the present embodiment. A same element as or an element corresponding to that of FIG. 10 is shown by the same reference number, and its detailed explanation will be omitted here.

A reference sign 7 is a rate-of-change limitation section. The rate-of-change limitation section 7 inputs an angle command θref [rad/s] and a disturbance observer output value Tobs, and outputs a rate-of-change limitation position command θcmd to a subtraction section 5.

A reference sign 8 is a target value filter section, and a reference sign 9 is a disturbance observer section. This disturbance observer section 9 calculates the disturbance observer output value Tobs from a torque current command Tdy and an angular velocity detection ωdy [rad/s].

Prior to an explanation of the embodiment of the present invention shown in FIG. 1, a case where a position control is carried out by a P control and a speed control is carried out by an I-P control will be explained.

In order for a current control section 3 to have a high response that does not affect frequency bands of a position control section 1 and a speed control section 2, the following equations are set.

$$\omega ref = KP\theta * (\theta ref - \theta dy) \tag{1}$$

$$\omega dy = \theta dy * s \tag{2}$$

$$Tdy = \{(KI\omega/s)*(\omega ref - \omega dy)\} - (KP\omega * \omega dy) \tag{3}$$

$$(Js+D)\omega dy = Tdy \tag{4}$$

Here, J is motor inertia [kgm$^2$], D is a rotation loss [Nms/rad], KPθ is a proportional gain of the position control section, KIω is an integral gain of the speed control section, KPω is a proportional gain of the speed control section, and s is a Laplace operator (Laplacian).

When determining θdy/θref from the above equations (1) to (4), the following expression is determined.

$$\theta dy/\theta ref = (KI\omega * KP\theta)/\{Js^3 + (KP\omega + D)s^2 + KI\omega s + (KI\omega * KP\theta)\} \tag{5}$$

A denominator polynomial of the expression (5) is a cubic polynomial, and linear to cubic coefficients of an expression obtained by dividing the denominator expression by a constant term KIω*KPθ and setting the constant term to 1 are independent with respect to KIω, KPθ, KPω. Therefore, when making coefficient comparison so that the denominator polynomial of the expression (5) becomes $1+c1*s+c2*s^2+c3*s3$, $$KP\theta = 1/c1 \tag{6}$$

$$KP\omega = (c2*J/c3) - D \tag{7}$$

$$KI\omega = c1*J/c3 \tag{8}$$

Parameters KPθ, KPω and KIω can be determined from the above (6) to (8).

For example, when a binomial coefficient, type (s+1) 3=1+ $3*s+3*s^2+1*s^3$ by which all poles become a damping coefficient 1 is determined and s is replaced with s/ws then their coefficients are c1, c2 and c3, in the case of the binomial coefficient type, $C1=3/wc$, $c2=3/wc^2$, $c3=1/wc^3$. For these c1 to c3, each parameter $KP\theta$, $KP\omega$ and $KI\omega$ of the position control section 1 and the speed control section 2, shown by the expressions (6) to (8), is determined.

The target value filter section 8 has a gain characteristic of $KI\omega/(KP\omega s+KP\theta)$, and when the speed control has a PI control configuration shown in FIG. 1, each parameter is determined by the expressions (6) to (8), then the target value filter section 8 is equivalent to an I-P control configuration of the speed control section 2.

In the embodiment shown in FIG. 1, since the three parameters $KP\theta$, $KP\omega$ and $KI\omega$ can be uniquely calculated as described above, the position control device is configured on the assumption that a parameter adjustment is not required.

Figure 2:
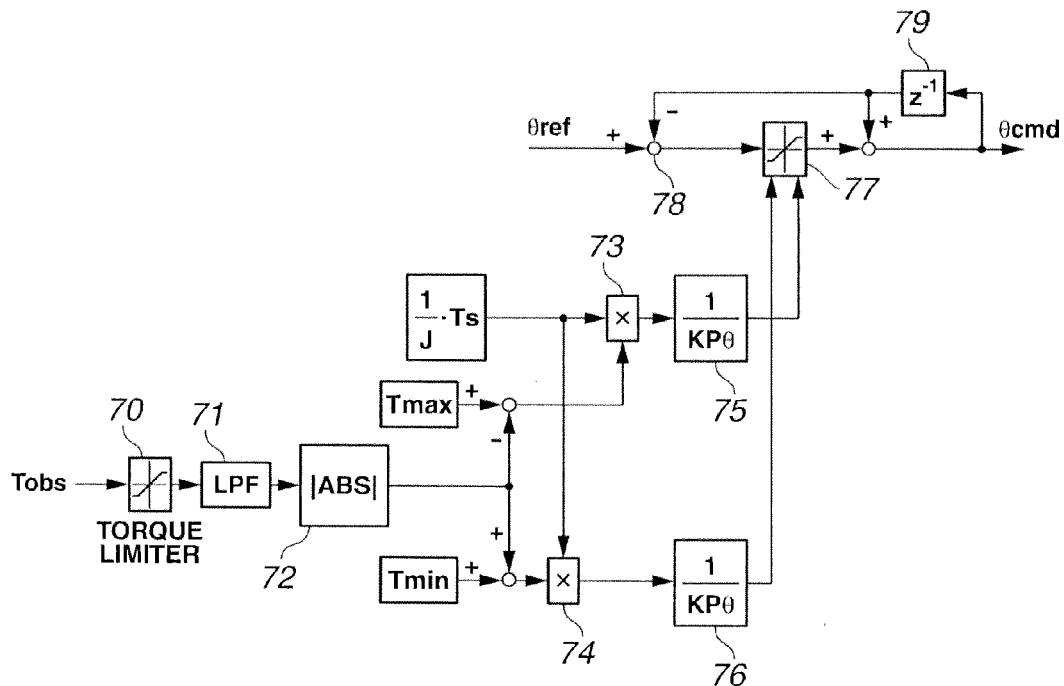
FIG. 2 is a block diagram of a rate-of-change limitation section.

The rate-of-change limitation section 7 shown in FIG. 1 is configured as shown in FIG. 2, and a rate-of-change limiter upper limit value ($\theta\_Rate\_Lim\_H$) is an expression (9), whereas a rate-of-change limiter lower limit value ($\theta\_Rate\_Lim\_L$) is an expression (10).

[Expression 1]

$$\theta\_Rate\_Lim\_H=(Tmax-|Tobs|)\cdot Ts/(J\cdot KP\theta) \quad (9)$$

[Expression 2]

$$\theta\_Rate\_Lim\_L=(Tmin-Tobs|)\cdot Ts/(J\cdot KP\theta) \quad (10)$$

The disturbance observer output value Tobs calculated at the disturbance observer section 9 is converted into an absolute value at an absolute value conversion section 72 through a torque limiter 70 and a low-pass filter 71.

The absolute value is compared with a rated maximum driving torque Tmax [Nm] of the electric motor, and a difference calculation (a difference operation) between the absolute value and the rated maximum driving torque Tmax [Nm] is performed. This difference calculation result is divided by the motor inertia J and multiplied by a predetermined sampling interval Ts [sec] (at a multiplication section 73), then is divided by the proportional gain $KP\theta$ of the position control section 1 at a proportional element 75. A signal obtained by the division is inputted to a limiter 77 and is set as the upper limit value of the rate-of-change limiter.

On the other hand, a setting rated maximum regenerative torque Tmin [Nm] of the electric motor is also added to the absolute value. This addition calculation result is divided by the motor inertia J and multiplied by the sampling interval Ts at a multiplication section 74. This result (multiplication result) is divided by the proportional gain $KP\theta$ of the position control section 1 at a proportional element 76. A signal obtained by the division is outputted from the proportional element 76 and inputted to the limiter 77, and is set as the lower limit value of the rate-of-change limiter.

That is, the rate-of-change limitation section 7 carries out the rate-of-change limitation with priority given to the disturbance observer, then the control is performed so that the speed control is not limited by the torque limiter.

A subtraction section 78 subtracts a last sampling rate-of-change limitation position command $\theta$cmd that is one-sampling-delayed by a delay circuit 79 from the angle command $\theta$ref inputted to the rate-of-change limitation section 7, and this subtraction result is inputted to the limiter 77. The limiter 77 outputs a signal that is proportional to an input signal between the setting upper and lower limit values, and this output signal and a last sampling value that is one-sampling-delayed by the delay circuit 79 are added together at an addition section, then this added value becomes the rate-of-change limitation position command $\theta$cmd and is outputted to the subtraction section 5.

At the subtraction section 5, a deviation signal between the rate-of-change limitation position command $\theta$cmd and the feedback angle detection $\theta$dy of the mechanical property section 4 is determined and is inputted to the target value filter section 8 through the position control section 1.

A subtraction section 6 performs a subtraction operation between the angular velocity command $\omega$ref passing through the target value filter section 8 and the feedback angular velocity detection $\omega$dy of the mechanical property section 4, and this subtraction result is inputted to the speed control section 2. The torque current command Tdy is then calculated at the speed control section 2, and is output: ted to the current control section 3 and the disturbance observer section 9.

Figure 3:
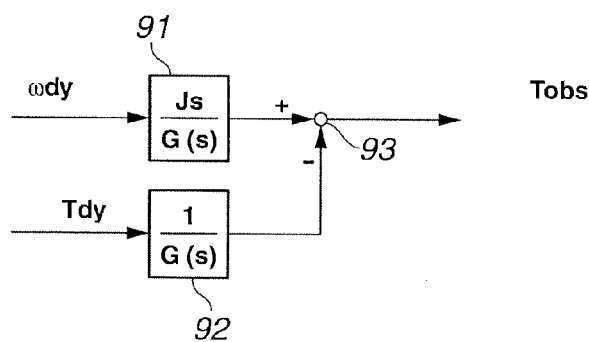
FIG. 3 is a block diagram of a disturbance observer section.

The disturbance observer section 9 is configured as shown in FIG. 3. That is, by inputting the angular velocity detection $\omega$dy to an element 91, inputting the torque current command Tdy to an element 92 and obtaining a difference signal between the both at a subtraction section 93, the disturbance observer section 9 estimates a signal corresponding to a disturbance torque. Here, G(s) is an arbitrary transfer function whose relative order is first order or more (or whose relative degree is first degree or more). s is the one that represents a differential operator by the Laplace operator (Laplacian).

Figure 4A:
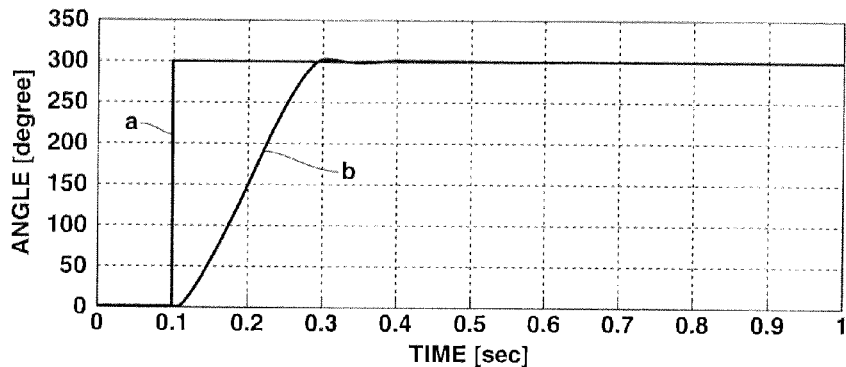
FIGS. 4A to 4C are command value step response characteristics according to the first embodiment.
Figure 4B:
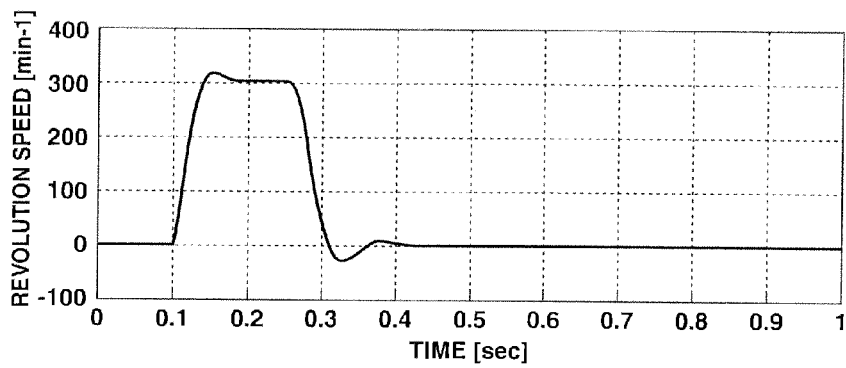
Figure 4C:
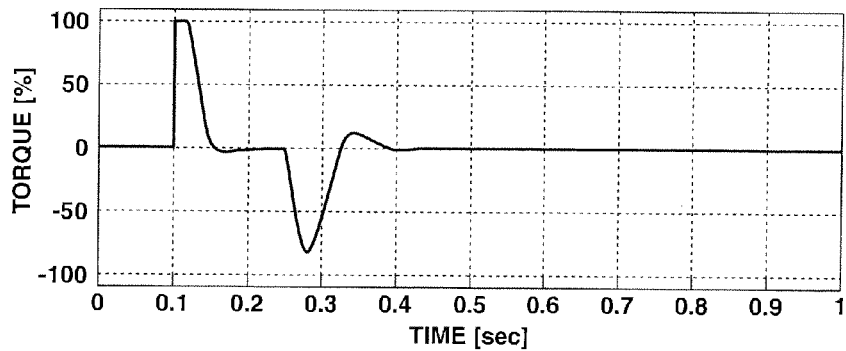

FIGS. 4A to 4C show command value step responses by the position control of the embodiment shown in FIG. 1. FIG. 4A is an angle detection value characteristic of an angle command value, FIG. 4B is a revolution speed characteristic, and FIG. 4C is a torque characteristic.

As is clear from FIGS. 4A to 4C, with regard to a detection value (a line "b") that is a response to a step-input angle command value indicated by a line "a", an occurrence of the overshoot that appears in the related art position control device is reduced. And by this reduction of the overshoot, each variation of the revolution speed and the torque is greatly suppressed.

Hence, according to the present embodiment, a stable position control and a high response control are allowed, and it is possible to reduce overshoot amounts, with respect to target value response, of a position command value and the position detection value. Further, by the fact that the disturbance observer output value Tobs is subtracted from the rated maximum driving torque Tmax, the present embodiment has an effect of allowing the position control that gives priority to the disturbance torque.

FIG. 5 shows a second embodiment. FIG. 5 of the second embodiment is the one in which a speed limiter 10 and the target value filter section 8 are provided in the position control device shown in FIG. 10. Here, the speed limiter 10 has an angular velocity limiter upper limit judgment section 11 and an angular velocity limiter lower limit judgment section 12. The other elements or sections are the same as those of FIG. 10.

An angular velocity limiter upper limit value $\omega\_Lim\_H$ by the speed limiter 10 is an expression (11), whereas an angular velocity limiter lower limit value $\omega\_Lim\_L$ by the speed limiter 10 is an expression (12).

[Expression 3]

$$\omega\_Lim\_H=Tmax/(J\cdot KP\theta) \quad (11)$$

[Expression 4]

$$\omega\_Lim\_L=Tmin/(J\cdot KP\theta) \quad (12)$$

The angular velocity limiter upper limit value ω_Lim_H is determined by the fact that the rated maximum driving torque Tmax is divided by the motor inertia J and the proportional gain KPθ of the position control section 1. The angular velocity limiter lower limit value ω_Lim_ is determined by the fact that the rated maximum regenerative torque Tmin is divided by the motor inertia J and the proportional gain KPθ of the position control section 1.

Here, as same as FIG. 1, the target value filter section 8 is equivalent to the I-P control configuration of the speed control section 2.

By the fact that the angular velocity command ωref obtained by multiplying a deviation signal between the angle command θref and the angle detection θdy by the proportional gain at the position control section 1 is inputted to the speed limiter 10, an angular velocity command value ωcmd that is speed-limited to (or between) the angular velocity limiter upper limit value ω_Lim_H and the angular velocity limiter lower limit value ω_Lim_L is generated. After this angular velocity command value ωcmd is outputted to the subtraction section 6 through the target value filter section 8 and the subtraction operation between this output and the angular velocity detection ωdy is executed, this calculation result is inputted to the speed control section 2. The torque current command Tdy is then calculated at the speed control section 2, and the electric motor is controlled through the current control section 3.

When arbitrarily setting the upper and lower limit values of the angular velocity limiter of the speed limiter 10, in a case where an external angular velocity limiter upper limit value Ext_H and an external angular velocity limiter lower limit value Ext_L are present, each limiter value is set by the angular velocity limiter upper and lower limit judgment sections 11 and 12.

That is, in the angular velocity limiter upper limit judgment section 11, when "Ext_H<(Tmax/(J·KPθ))" is judged, a terminal is switched from a to b, and the angular velocity limiter upper limit value ω_Lim_H is set to "ω_Lim_H =Ext_H". In the angular velocity limiter upper limit judgment section 11, when "Ext_H<(Tmax/(J·KPθ))" is judged, the terminal is switched from b to a, and the angular velocity limiter upper limit value ω_Lim_H is set to "ω_Lim_H=Tmax/(J·KPθ)".

Also, in the angular velocity limiter lower limit judgment section 12, when "Ext_L<(Tmin/(J·KPθ))" is judged, a terminal is switched from a' to b', and the angular velocity limiter lower limit value ω_Lim_L is set to "ω_Lim_L=Ext_L". In the angular velocity limiter lower limit judgment section 12, when "Ext_L<(Tmin/(J·KPθ))" is judged, the terminal is switched from b' to a', and the angular velocity limiter lower limit value ω_Lim_L is set to "_Lim_L=Tmin/(J·KPθ)".

Figure 6A:
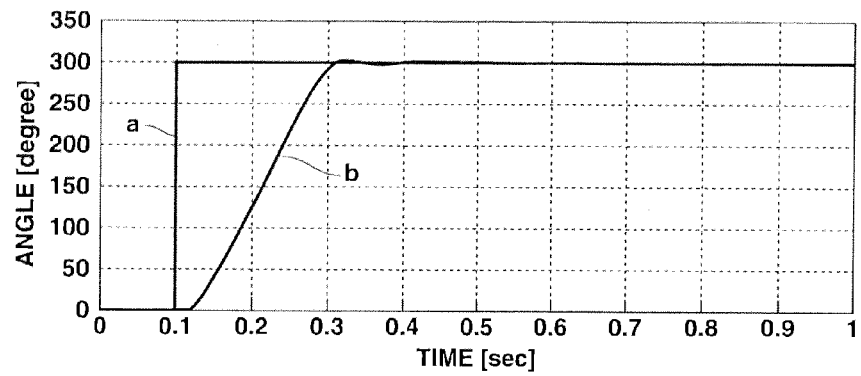
FIGS. 6A to 6C are command value step response characteristics according to the second embodiment.
Figure 6B:
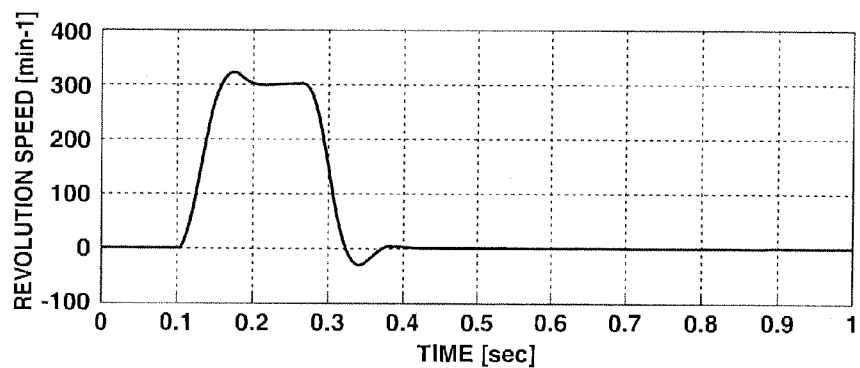
Figure 6C:
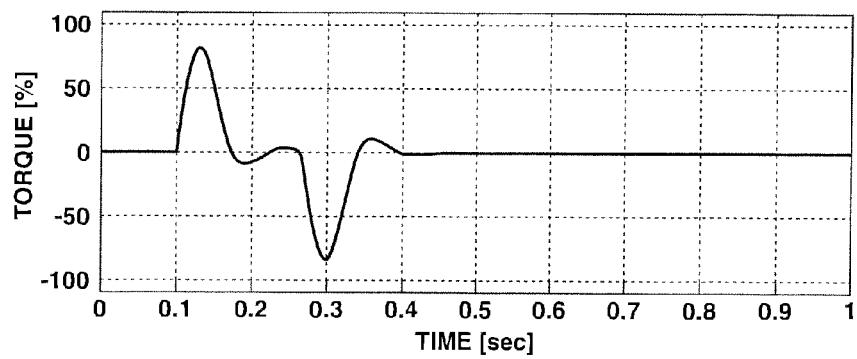

FIGS. 6A to 6C show command value step responses by the position control of the embodiment shown in FIG. 5. FIG. 6A is an angle detection value characteristic of an angle command value, FIG. 6B is a revolution speed characteristic, and FIG. 6C is a torque characteristic.

As is clear from FIGS. 6A to 6C, with regard to a detection value indicated by a line "b" that is a response to a step-input angle command value indicated by a line "a", an occurrence of the overshoot that appears in the related art position control device is reduced. And by this reduction of the overshoot, each variation of the revolution speed and the torque is greatly suppressed.

Hence, according to the second embodiment, even in a case where the disturbance torque that is equal to or greater than the rated maximum driving torque Tmax is inputted, the stable position control and the high response control are allowed, and it is possible to reduce the overshoot amounts, with respect to the target value response, of the position command value and the position detection value.

In addition, by providing the arbitrary angular velocity limiter upper and lower limit, values, an operation as an overspeed preventing function becomes possible.

Figure 7:
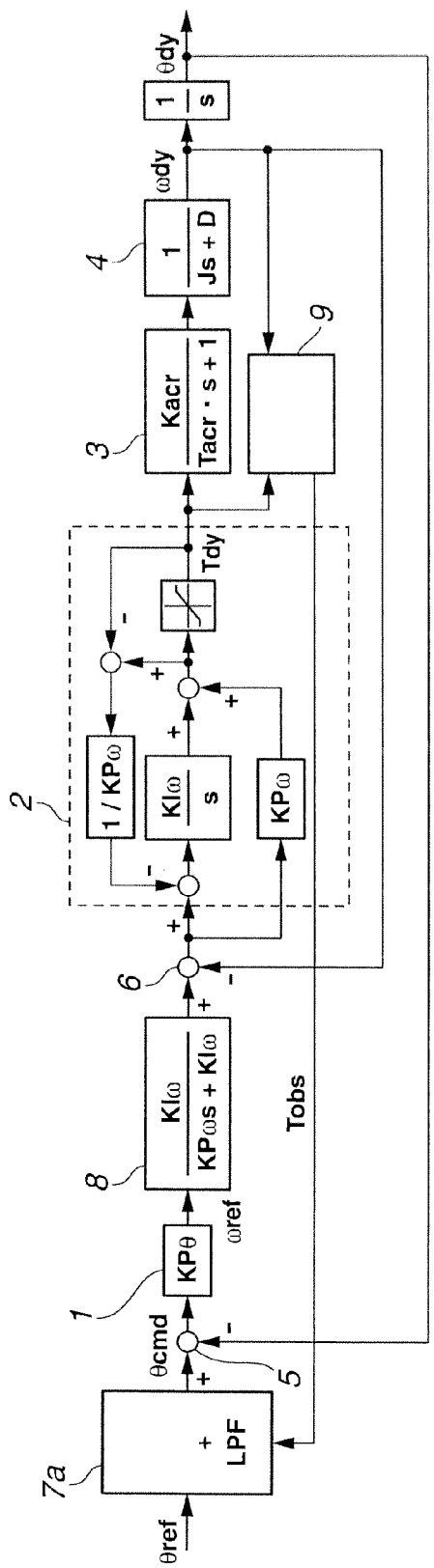
FIG. 7 is a block diagram of a position control device showing a third embodiment of the present invention.
Figure 8:
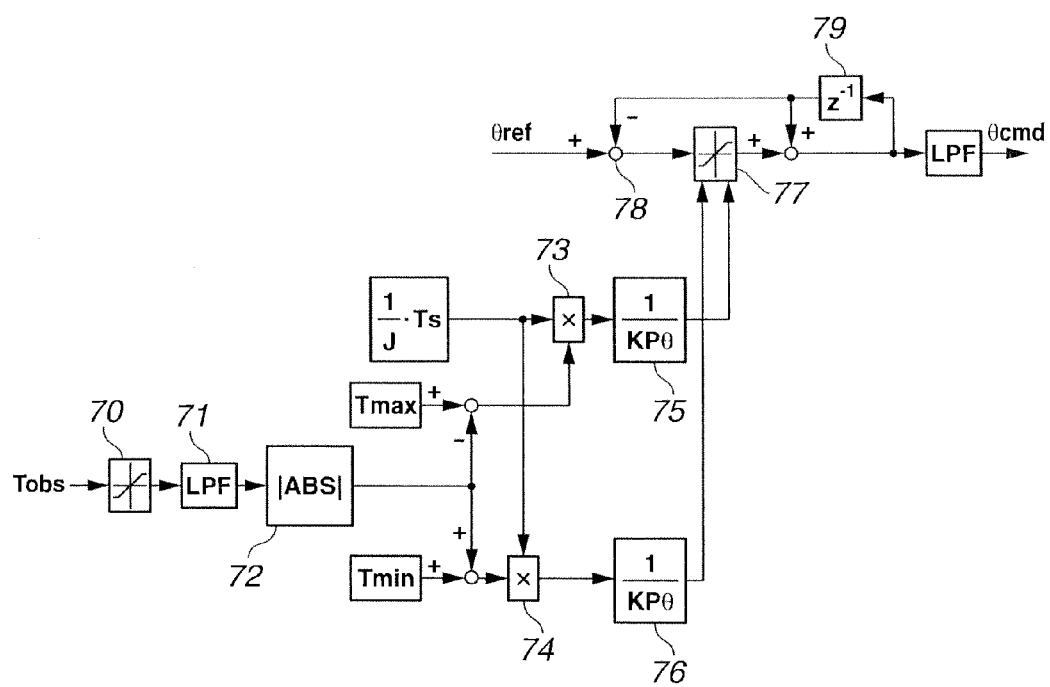
FIG. 8 is a block diagram of a rate-of-change limitation section.

FIG. 7 shows a third embodiment. In the present embodiment, a different point from the first embodiment shown in FIG. 1 is to provide a low-pass filter LPF at an output side of a rate-of-change limitation section 7a. FIG. 8 shows a block diagram of the rate-of-change limitation section 7a. The low-pass filter LPF is set at an output side of the limiter 77, and the rate-of-change limitation position command θcmd is obtained after passing through this low-pass filter LPF. The other elements or sections are the same as those of FIG. 1.

FIGS. 9A to 9C show command value step responses by the position control of the third embodiment. As compared with the first embodiment, it is possible to further reduce the overshoot amounts of the position command value and the position detection value, and the stable and high response position control is allowed.

As explained above, according to the present invention, it is possible to reduce the overshoot amounts, with respect to the target value response, of the position command value and the position detection value, then the stable and high response position control becomes possible.

The invention claimed is:

1. A position control device for an electric motor, which inputs a deviation signal between an angle command and an angle detection value to a position control section and calculates an angular velocity command, inputs a deviation signal between this angular velocity command and an angular velocity detection value to a speed control section and calculates a torque current command, and controls, on the basis of this torque current command, the electric motor that is an object to be controlled through a current control section, the position control device comprising:

a disturbance observer section which inputs the torque current command and the angular velocity detection value and estimates a signal corresponding to a disturbance torque;

a rate-of-change limitation section which has a limiter inputting a disturbance observer output value by this disturbance observer section and performing rate-of-change limitation of upper and lower limit values of the angle command; and a target value filter section which is configured by a control gain equivalent to the speed control section and through which the angular velocity command from the position control section passes.

2. The position control device for the electric motor as claimed in claim 1, wherein:

a rate-of-change limiter upper limit value of the rate-of-change limitation section is a value obtained by subtracting an output absolute value of the disturbance observer section from a rated maximum driving torque of the electric motor, multiplying this subtraction result by a sampling interval and dividing this multiplication value by motor inertia and a proportional gain of the position control section, and a rate-of-change limiter lower limit value of the rate-of-change limitation section is a value obtained by adding a rated maximum regenerative torque of the electric motor and the output absolute value of the disturbance observer section together, multiplying this addition result by the sampling interval and dividing this multiplication value by the motor inertia and the proportional gain of the position control section.

3. The position control device for the electric motor as claimed in claim 1, wherein:
the disturbance observer section estimates, as a corresponding disturbance torque, a difference signal between the angular velocity detection value and the torque current command.

4. The position control device for the electric motor as claimed in claim 1, wherein:
a low-pass filter is provided at an output side of the limiter of the rate-of-change limitation section.

5. A position control device for an electric motor, which inputs a deviation signal between an angle command and an angle detection value to a position control section and calculates an angular velocity command, inputs a deviation signal between this angular velocity command and an angular velocity detection value to a speed control section and calculates a torque current command, and controls, on the basis of this torque current command, the electric motor that is an object to be controlled through a current control section, the position control device comprising:
a speed limiter which is provided at an output side of the position control section for speed limitation; and
a target value filter section which is configured by a control gain equivalent to the speed control section and through which the angular velocity command passing through the speed limiter passes.

6. The position control device for the electric motor as claimed in claim 5, wherein:
an angular velocity limiter upper limit value of the speed limiter is a value determined by a fact that a rated maximum driving torque of the electric motor is divided by motor inertia and a proportional gain of the position control section, and
an angular velocity limiter lower limit value of the speed limiter is a value determined by a fact that a rated maximum regenerative torque is divided by the motor inertia and the proportional gain of the position control section.

7. The position control device for the electric motor as claimed in claim 6, wherein:
the speed limiter is provided with an angular velocity limiter upper limit judgment section and an angular velocity limiter lower limit judgment section for allowing variation of the angular velocity limiter upper limit value and the angular velocity limiter lower limit value respectively.

* * * * *